(12) United States Patent
Kang et al.

(10) Patent No.: US 9,875,717 B2
(45) Date of Patent: Jan. 23, 2018

(54) LIQUID CRYSTAL DISPLAY DEVICE HAVING IMPROVED SIDE VISIBILITY

(71) Applicant: Samsung Display Co., Ltd., Yongin-si, Gyeonggi-do (KR)

(72) Inventors: Jang Mi Kang, Bucheon-si (KR); Kwang-Chul Jung, Seongnam-si (KR); Cheol-Gon Lee, Seoul (KR); Mee Hye Jung, Suwon-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 15/098,064

(22) Filed: Apr. 13, 2016

(65) Prior Publication Data

US 2016/0322017 A1    Nov. 3, 2016

(30) Foreign Application Priority Data

Apr. 28, 2015    (KR) .......................... 10-2015-0060002

(51) Int. Cl.
*G09G 3/36*      (2006.01)
*G02F 1/1362*    (2006.01)
(Continued)

(52) U.S. Cl.
CPC ..... *G09G 3/3696* (2013.01); *G02F 1/133377* (2013.01); *G02F 1/134309* (2013.01); *G02F 1/136286* (2013.01); *G09G 3/3614* (2013.01); *G09G 3/3648* (2013.01); *G09G 3/3655* (2013.01); *G09G 3/3677* (2013.01); *G09G 3/3688* (2013.01); *G02F 2001/134345* (2013.01); *G09G 2300/0426* (2013.01); *G09G 2300/0447* (2013.01); *G09G 2300/0478* (2013.01)

(58) Field of Classification Search
CPC .. G09G 3/30; G09G 3/36; G09G 5/00; G09G 3/34; G09G 3/32; G06F 3/038
See application file for complete search history.

(56) References Cited

U.S. PATENT DOCUMENTS

2008/0165299 A1*   7/2008   Huang ................. G09G 3/3659
                                                                      349/38
2011/0057867 A1*   3/2011   Kim ................... G02F 1/136286
                                                                      345/87

(Continued)

FOREIGN PATENT DOCUMENTS

| KR | 10-2010-0048264 A | 5/2010 |
|----|-------------------|--------|
| KR | 10-2010-0129666 A | 12/2010 |
| KR | 10-2014-0025081 A | 3/2014 |

*Primary Examiner* — Pegeman Karimi
(74) *Attorney, Agent, or Firm* — Innovation Counsel LLP

(57) ABSTRACT

Provided is a liquid crystal display device including: a substrate; a first gate line; a first data line and a second data line to which data voltages with different polarities are applied; a first pixel electrode connected to the first gate line and the first data line; a liquid crystal layer formed on the first pixel electrode; and a first common electrode and a second common electrode disposed on the liquid crystal layer, in which the first pixel electrode includes a first subpixel electrode overlapping with the first common electrode and a second subpixel electrode overlapping with the second common electrode. A first voltage and A second voltage are alternatingly applied to the first common electrode and the second common electrode every two or more frames, respectively.

14 Claims, 9 Drawing Sheets

(51) Int. Cl.
  *G02F 1/1343* (2006.01)
  *G02F 1/1333* (2006.01)

(56) References Cited

U.S. PATENT DOCUMENTS

2013/0308071 A1 11/2013 Kim et al.
2014/0285478 A1* 9/2014 Ono .................... G09G 3/3614
                                                      345/209

* cited by examiner

LIQUID CRYSTAL DISPLAY DEVICE HAVING IMPROVED SIDE VISIBILITY

CROSS-REFERENCE TO RELATED APPLICATION

This application claims priority to and the benefit of Korean Patent Application No. 10-2015-0060002 filed in the Korean Intellectual Property Office on Apr. 28, 2015, the entire contents of which are incorporated herein by reference.

BACKGROUND (a) Field

The present inventive concept relates to a liquid crystal display device.

(b) Description of the Related Art

A liquid crystal display device which is one of the most common types of flat panel displays currently in use, includes two display panels with field generating electrodes such as a pixel electrode and a common electrode, and a liquid crystal layer interposed therebetween. The liquid crystal display device generates an electric field in the liquid crystal layer by applying a voltage to the field generating electrodes to determine alignment of liquid crystal molecules of the liquid crystal layer through the generated electric field and control polarization of incident light, thereby displaying images.

The two display panels configuring the liquid crystal display device may include a thin film transistor array panel and an opposing display panel. In the thin film transistor array panel, a gate line transferring a gate signal and a data line transferring a data signal are formed to cross each other, and a thin film transistor connected with the gate line and the data line, a pixel electrode connected with the thin film transistor, and the like may be formed. In the opposing display panel, a light blocking member, a color filter, a common electrode, and the like may be formed. In some cases, the light blocking member, the color filter, and the common electrode may be formed on the thin film transistor array panel.

Among the liquid crystal display devices, a vertically aligned mode liquid crystal display device, in which long axes of liquid crystal molecules are aligned to be vertical to the display panels when no electric field is applied to the liquid crystal molecules, has been in the limelight due to a large contrast ratio and a wide reference viewing angle. Here, the reference viewing angle means a viewing angle or a luminance inversion limit angle between grays of which a contrast ratio is 1:10.

In the case of the vertically aligned mode liquid crystal display device, in order to approximate side visibility to front visibility, a method of varying transmittance by dividing one pixel into two subpixels and varying voltages of the two subpixels is proposed. In this case, in order to vary the voltages of the two subpixels, there is a problem in that a circuit is complicated or costs of manufacturing are increased.

The above information disclosed in this Background section is only for enhancement of understanding of the background of the inventive concept and therefore it may contain information that does not form the prior art that is already known in this country to a person of ordinary skill in the art.

SUMMARY

The present inventive concept has been made in an effort to provide a liquid crystal display device having advantages of improving side visibility for each panel position.

An exemplary embodiment of the present inventive concept provides a liquid crystal display device including: a substrate; a first gate line disposed on the substrate; a first data line and a second data line disposed on the substrate and to which data voltages with different polarities are applied; a first pixel electrode connected to the first gate line and the first data line; a liquid crystal layer formed on the first pixel electrode; and a first common electrode and a second common electrode disposed on the liquid crystal layer, in which the first pixel electrode includes a first subpixel electrode overlapping with the first common electrode and a second subpixel electrode overlapping with the second common electrode, when a first voltage is applied to the first common electrode, a second voltage different from the first voltage is applied to the second common electrode, and when the second voltage is applied to the first common electrode, the first voltage is applied to the second common electrode, and the first voltage and the second voltage applied to the first common electrode and the second common electrode are cross-applied at an interval of two frames or more.

The second voltage may be higher than the first voltage.

The liquid crystal display device may further include a second pixel electrode connected to the first gate line and the second data line, in which the second pixel electrode may include a third subpixel electrode overlapping with the first common electrode and a fourth subpixel electrode overlapping with the second common electrode.

A positive data voltage may be applied to the first pixel electrode and a negative data voltage may be applied to the second pixel electrode.

The liquid crystal display device may include a plurality of the first gate lines, gate-on voltages may be sequentially applied to the plurality of first gate lines, and a timing when the positive data voltage is applied to the first pixel electrode and the negative data voltage is applied to the second pixel electrode may be determined according to a signal applied to the first gate line.

The first voltage and the second voltage may be alternatingly applied to the first common electrode and the second common electrode every two frames In the first pixel electrode disposed in a middle region of the liquid crystal display device, when a common voltage applied to the first common electrode is changed from the first voltage to the second voltage in an N-th frame and changed from the second voltage to the first voltage in an N+2-th frame, the common voltage applied to the second common electrode may be changed from the second voltage to the first voltage in the N-th frame and changed from the first voltage to the second voltage in the N+2-th frame.

The first voltage and the second voltage may be alternatingly applied to the first common electrode and the second common electrode every three frames.

In the first pixel electrode disposed in the middle region of the liquid crystal display device, the adjacent two frames may be set as a polarity change unit, the first subpixel electrode may be maintained with a positive polarity from a middle time of the N-th frame to the middle time of the N+1-th frame and maintained with a negative polarity from the middle time of the N+2-th frame to the middle time of an N+3-th frame, and the second subpixel electrode may be maintained with a negative polarity from a middle time of the N-th frame to the middle time of the N+1-th frame and maintained with a positive polarity from the middle time of the N+2-th frame to the middle time of an N+3-th frame.

In the first pixel electrode disposed in a middle region of the liquid crystal display device, when a common voltage applied to the first common electrode is changed from the first voltage to the second voltage in an N-th frame and changed from the second voltage to the first voltage in an N+3-th frame, the common voltage applied to the second common electrode may be changed from the second voltage to the first voltage in the N-th frame and changed from the first voltage to the second voltage in the N+3-th frame.

In the first pixel electrode disposed in the middle region of the liquid crystal display device, the adjacent three frames are set as a polarity change unit, the first subpixel electrode may be maintained with a positive polarity from a middle time of the N-th frame to the middle time of the N+1-th frame and maintained with a negative polarity from the middle time of the N+1-th frame to the middle time of an N+2-th frame, and the second subpixel electrode may be maintained with a negative polarity from a middle time of the N-th frame to the middle time of the N+1-th frame and maintained with a positive polarity from the middle time of the N+1-th frame to the middle time of an N+2-th frame.

The liquid crystal display device may further include: a second gate line disposed on the substrate; a third data line disposed on the substrate and to which the data voltage having the same polarity as the first data line is applied; a third pixel electrode connected to the second gate line and the second data line; and a fourth pixel electrode connected to the second gate line and the third data line, in which the third pixel electrode may include a fifth subpixel electrode overlapping with the second common electrode and a sixth subpixel electrode overlapping with the first common electrode, and the fourth pixel electrode may include a seventh subpixel electrode overlapping with the second common electrode and an eighth subpixel electrode overlapping with the first common electrode.

The fifth subpixel electrode and the sixth subpixel electrode may be connected to each other, and the seventh subpixel electrode and the eighth subpixel electrode may be connected to each other.

The liquid crystal display device may further include a first common electrode line and a second common electrode line disposed on the substrate, in which the first common electrode line may be connected with the first common electrode, and the second common electrode line may be connected with the second common electrode The first common electrode line and the second common electrode line may be disposed on the same layer as the first gate line.

The liquid crystal display device may further include a roof layer disposed on the first common electrode and the second common electrode; and an overcoat disposed on the roof layer, and a plurality of microcavities of which an upper surface and a side are covered by the roof layer and the overcoat, in which the liquid crystal layer may be disposed in the plurality of microcavities.

According to the exemplary embodiment of the present inventive concept, it is possible to improve side visibility for each position of a panel, reduce an afterimage, and improve a liquid crystal response speed.

DETAILED DESCRIPTION OF THE EMBODIMENTS

Figure 1:
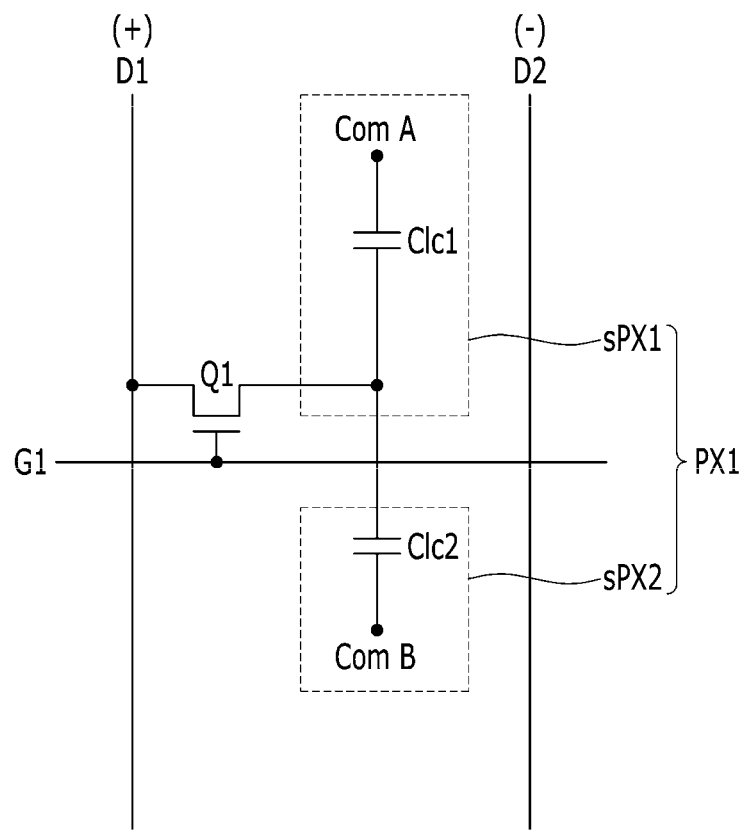
FIG. 1 is an equivalent circuit diagram illustrating a liquid crystal display device according to an exemplary embodiment of the present inventive concept.

The present inventive concept will be described more fully hereinafter with reference to the accompanying drawings, in which exemplary embodiments of the inventive concept are shown. As those skilled in the art would realize, the described embodiments may be modified in various different ways, all without departing from the spirit or scope of the present inventive concept.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

First, a liquid crystal display device according to an exemplary embodiment of the present inventive concept will be described below with reference to FIG. 1.

FIG. 1 is an equivalent circuit diagram illustrating a liquid crystal display device according to an exemplary embodiment of the present inventive concept.

The display device according to the exemplary embodiment of the present inventive concept includes a first gate line G1, a first data line D1, a second data line D2, and a first pixel PX1 connected to those signal lines.

The first gate line G1 transfers a gate signal and the gate signal may be configured by a gate-on voltage and a gate-off voltage. The first data line D1 and the second data line D2 transfer data voltages, and polarities of the data voltage applied to the first data line D1 and the data voltage applied to the second data line D2 are different from each other. For example, when a positive data voltage is applied to the first data line D1, a negative data voltage is applied to the second data line D2. On the contrary, when the negative data voltage is applied to the first data line D1, the positive data voltage is applied to the second data line D2.

The first thin film transistor Q1 is connected to the first gate line G1 and the first data line D1, and the first pixel PX1 includes a first subpixel sPX1 and a second subpixel sPX2.

In the first subpixel sPX1, a first liquid crystal capacitor C1c1 connected to a first thin film transistor Q1 is formed, and in the second subpixel sPX2, a second liquid crystal capacitor C1c2 connected to the first thin film transistor Q1 is formed.

The first liquid crystal capacitor C1c1 is connected to a first common electrode ComA, and the second liquid crystal capacitor C1c2 is connected to a second common electrode ComB. Different voltages are applied to the first common electrode ComA and the second common electrode ComB. For example, when the first voltage is applied to the first common electrode ComA, the second voltage is applied to the second common electrode ComB. On the contrary, when the second voltage is applied to the first common electrode ComA, the first voltage is applied to the second common electrode ComB.

Although not illustrated in FIG. 1, the pixel electrode further includes a plurality of pixels PX2, PX3, . . . , PXn including two subpixels which overlap with the first common electrode ComA and the second common electrode ComB to which different voltages are applied, like the first pixel PX1.

Hereinafter, an operation of the liquid crystal display device according to the exemplary embodiment of the present inventive concept will be described with reference to FIGS. 2 and 3.

Figure 2:
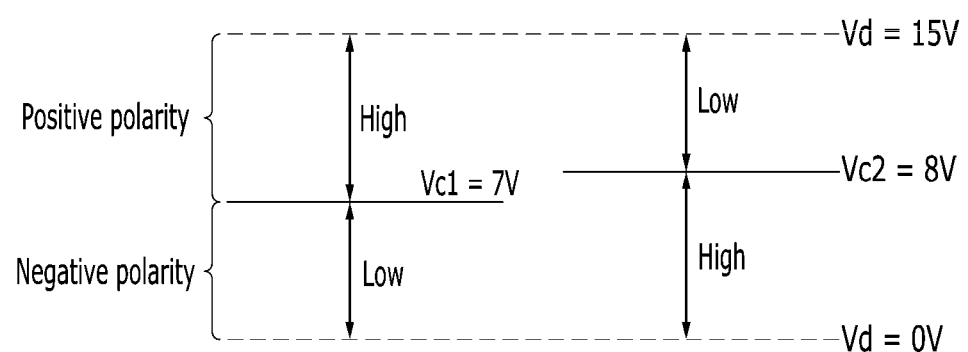
FIG. 2 is a diagram illustrating a data voltage Vd transferred through each data line and a common voltage applied to each common electrode.
Figure 3:
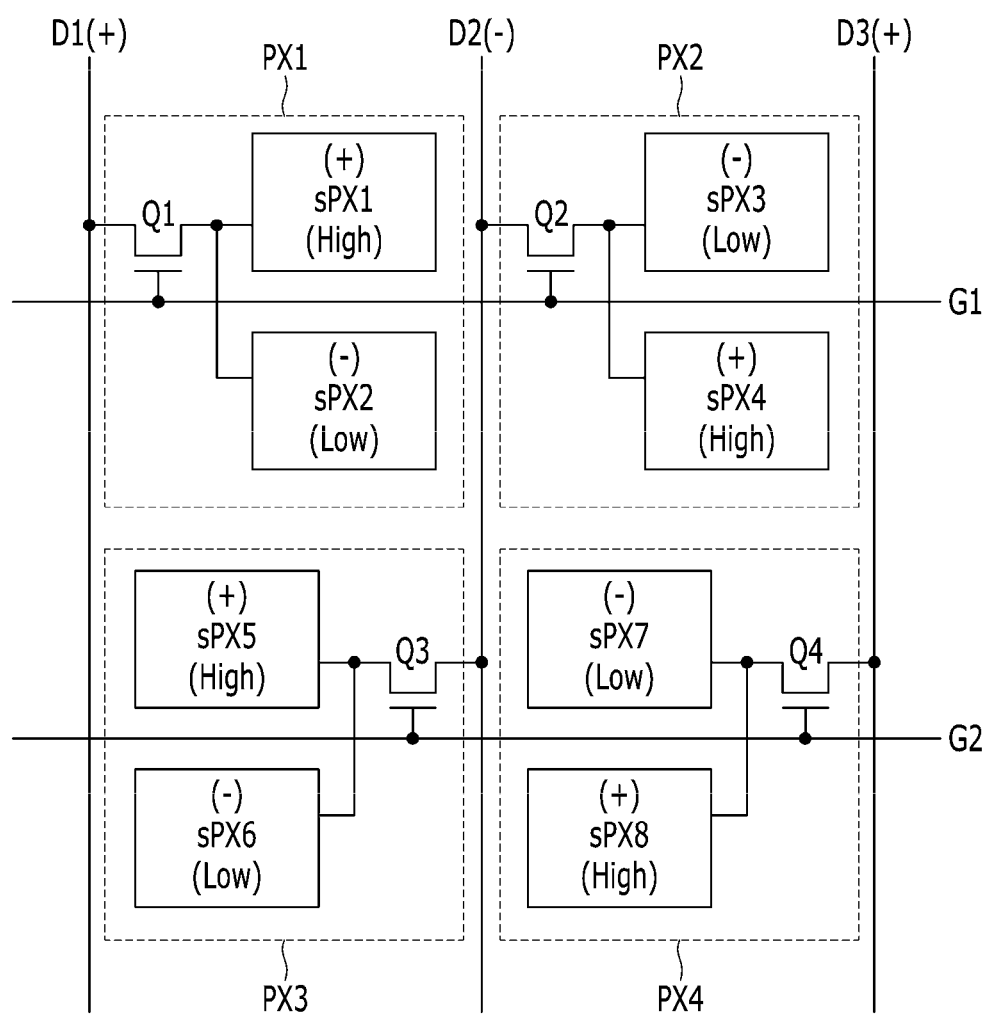
FIG. 3 is a diagram illustrating a polarity of a data voltage Vd applied to each pixel of the liquid crystal display device according to the exemplary embodiment of the present inventive concept.

FIG. 2 is a diagram illustrating a data voltage Vd transferred through each data line and a common voltage applied to each common electrode, and FIG. 3 is a diagram illustrating a data voltage Vd applied to each pixel of the liquid crystal display device according to the exemplary embodiment of the present inventive concept.

First, as illustrated in FIG. 2, a data voltage Vd may be configured as a voltage of 0 V to 15 V. The data voltage Vd may be divided into a positive data voltage Vd and a negative data voltage Vd. The positive data voltage Vd means a voltage higher than a common voltage, and the negative data voltage Vd means a voltage lower than the common voltage.

The common voltage may be configured by a first common voltage Vc1 and a second common voltage Vc2, and two voltages may be alternately applied to the first common electrode ComA and the second common electrode ComB, respectively. However, different voltages are applied to the first common electrode ComA and the second common electrode ComB. The second common voltage Vc2 may be higher than the first common voltage Vc1, and for example, the first common voltage Vc1 may be 7 V and the second common voltage Vc2 may be 8 V.

Values of the data voltage Vd and the common voltage are just exemplified and may be variously modified.

In FIG. 3, in order to describe polarities for other pixels adjacent to one pixel illustrated in FIG. 1, polarities of data voltages Vd for the plurality of pixels are illustrated.

The display device according to the exemplary embodiment of the present inventive concept may include a first gate line G1, a second gate line G2, a first data line D1, a second data line D2, a third data line D3, and a first pixel PX1, a second pixel PX2, a third pixel PX3, and a fourth pixel PX4 connected to the signal lines.

The first data line D1, the second data line D2, and the third data line D3 transfer the data voltages. In this case, polarities of the data voltage applied to the first data line D1 and the data voltage applied to the third data line D3 are the same as each other, and polarities of the data voltage applied to the second data line D2 and the data voltage applied to the first data line D1 are different from each other. For example, when a positive data voltage is applied to the first data line D1 and the third data line D3, a negative data voltage is applied to the second data line D2.

The first thin film transistor Q1 is connected to the first gate line G1 and the first data line D1, the second thin film transistor Q2 is connected to the first gate line G1 and the second data line D2, the third thin film transistor Q3 is connected to the second gate line G2 and the second data line D2, and the fourth thin film transistor Q4 is connected to the second gate line G2 and the third data line D3.

The first pixel PX1 includes a first subpixel sPX1 and a second subpixel sPX2, the second pixel PX2 includes a third subpixel sPX3 and a fourth subpixel sPX4, the third pixel PX3 includes a fifth subpixel sPX5 and a sixth subpixel sPX6, and the fourth pixel PX4 includes a seventh subpixel sPX7 and an eighth subpixel sPX8.

In the present inventive concept, common electrodes to which the same common voltage is applied are formed in adjacent subpixels in a row direction. That is, the first common electrode ComA is formed in the first subpixel sPX1 and the third subpixel sPX3, and the second common electrode ComB is formed in the second subpixel sPX2 and the fourth subpixel sPX4. Further, common electrodes to which the same common voltage is applied are formed even in adjacent subpixels of adjacent pixels in a column direction. That is, the second common electrode ComB is formed in the fifth subpixel sPX5 and the seventh subpixel sPX7 corresponding to a column adjacent to the second subpixel sPX2 and the fourth subpixel sPX4.

As illustrated in FIG. 3, when the gate-on voltage is applied to the first gate line G1, the first thin film transistor Q1 and the second thin film transistor Q2 which are connected to the first gate line G1 are turned on.

In this case, the positive data voltage Vd is transferred through the first data line D1, and the negative data voltage Vd may be transferred through the second data line D2. In this case, the first common voltage Vc1 may be applied to the first common electrode ComA, and the second common voltage Vc2 may be applied to the second common electrode ComB.

The first subpixel sPX1 and the second subpixel sPX2 receive the same data voltage Vd. Since the first liquid crystal capacitor C1c1 is connected to the first common electrode ComA and the second liquid crystal capacitor C1c2 is connected to the second common electrode ComB, a charging amount of the first liquid crystal capacitor C1c1 is different from a charging amount of the second liquid crystal capacitor C1c2.

For example, it is assumed that a positive data voltage Vd of 15 V is applied to the first data line D1, a first common voltage Vc1 of 7 V is applied to the first common electrode ComA, and a second common voltage Vc2 of 8 V is applied to the second common electrode ComB. In this case, a voltage difference between the data voltage Vd and the common voltage in the first subpixel sPX1 is larger than that of the second subpixel sPX2. Accordingly, the first subpixel sPX1 has a higher voltage difference than the second subpixel sPX2 to have higher transmittance.

The third subpixel sPX3 and the fourth subpixel sPX4 receive the same data voltage Vd. Since the third subpixel sPX3 is connected to the first common electrode ComA and the fourth subpixel sPX4 is connected to the second common electrode ComB, the voltage difference between the data voltage Vd and the common voltage in the fourth subpixel sPX4 is larger than that of the third subpixel sPX3. Accordingly, the fourth subpixel sPX4 has a higher voltage difference than the third subpixel sPX3 to have higher transmittance.

Next, when the gate-on voltage is applied to the second gate line G2, the third thin film transistor Q3 and the fourth thin film transistor Q4 which are connected to the second gate line G2 are turned on. As a result, the fifth subpixel sPX5 and the sixth subpixel sPX6 have polarities by the data voltage Vd transferred through the second data line D2, and the seventh subpixel sPX7 and the eighth subpixel sPX8 have polarities by the data voltage Vd transferred through the third data line D3.

In this case, the negative data voltage Vd is transferred through the second data line D2, and the positive data voltage Vd may be transferred through the third data line D3. In this case, the first common voltage Vc1 may be applied to the first common electrode ComA, and the second common voltage Vc2 may be applied to the second common electrode ComB.

The fifth subpixel sPX5 and the sixth subpixel sPX6 receive the same data voltage Vd from the second data line D2. Since the fifth subpixel sPX5 is connected to the second common electrode ComB and the sixth subpixel sPX6 is connected to the first common electrode ComA, the fifth subpixel sPX5 has a higher voltage difference than the sixth subpixel sPX6 to have higher transmittance.

The seventh subpixel sPX7 and the eighth subpixel sPX8 receive the same data voltage Vd from the third data line D3. Since the seventh subpixel sPX7 is connected to the second common electrode ComB and the eighth subpixel sPX8 is connected to the first common electrode ComA, the eighth subpixel sPX8 has a higher voltage difference than the seventh subpixel sPX7 to have higher transmittance.

In summary, since the same data voltage is applied to two subpixels disposed in the same pixel and the respective liquid crystal capacitors disposed in two subpixels are connected to the common electrodes to which different common voltages are connected, the two subpixels have different voltage differences and have different transmittance. In the present inventive concept, while one data voltage is applied to one pixel through one thin film transistor, two subpixels having different transmittance may be implemented.

Further, data voltages having different polarities are applied to adjacent data lines, and as a result, the adjacent pixels in the row direction have different polarities. Further, different data lines are connected to the adjacent pixels in the column direction, and as a result, the adjacent pixels in the column direction have different polarities.

Figure 4:
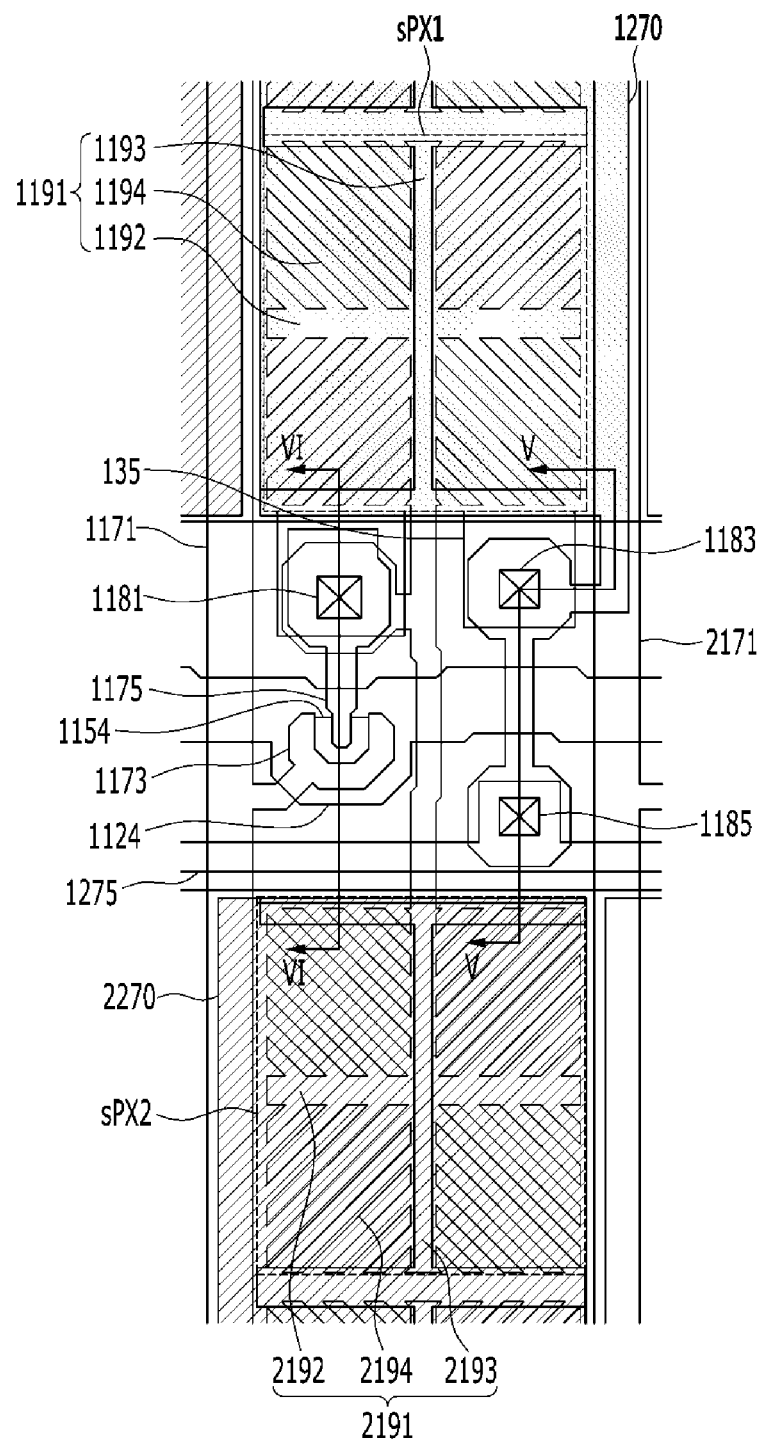
FIG. 4 is a layout view illustrating a part of the liquid crystal display device according to the exemplary embodiment of the present inventive concept.
Figure 5:
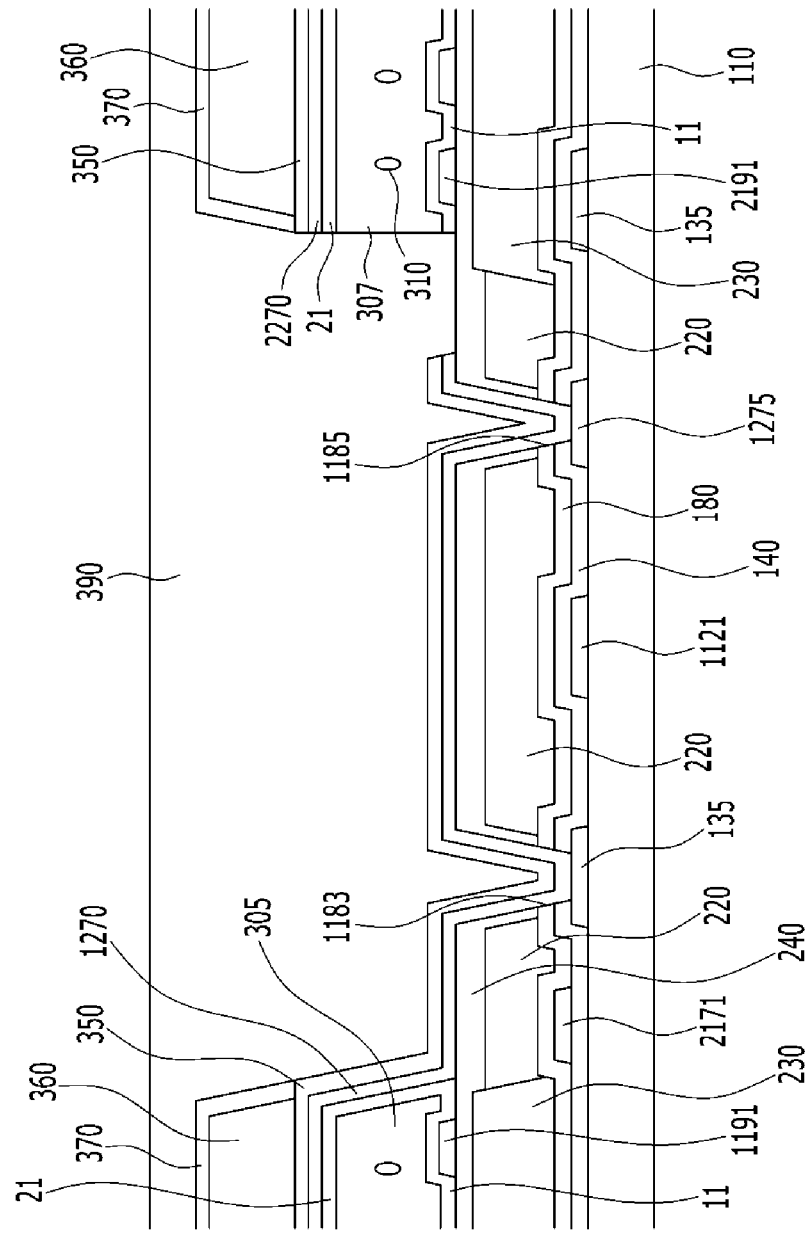
FIG. 5 is a cross-sectional view illustrating the liquid crystal display device of FIG. 4 taken along line VI-VI according to the exemplary embodiment of the present inventive concept.
Figure 6:
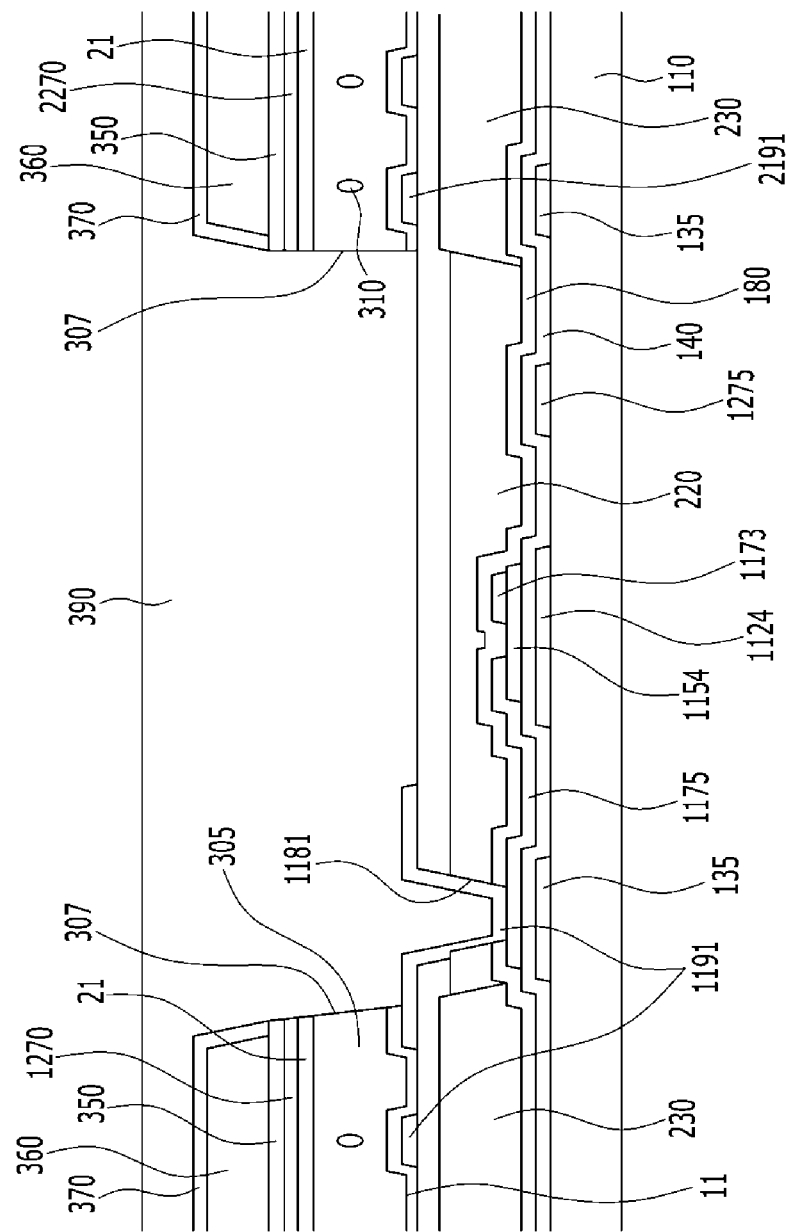
FIG. 6 is a cross-sectional view illustrating the liquid crystal display device of FIG. 4 taken along line VII-VII according to the exemplary embodiment of the present inventive concept.

FIG. 4 is a layout view illustrating a portion of the liquid crystal display device according to the exemplary embodiment of the present inventive concept, FIG. 5 is a cross-sectional view illustrating the liquid crystal display device of FIG. 4 taken along line V-V according to the exemplary embodiment of the present inventive concept, and FIG. 6 is a cross-sectional view illustrating the liquid crystal display device of FIG. 4 taken along line VI-VI according to the exemplary embodiment of the present inventive concept.

Referring to FIGS. 4 to 6, a first gate line 1121 and a first gate electrode 1124 which protrude from the first gate line 1121 are formed on a substrate 110. The first gate line 1121 extends mainly in a horizontal direction and transfers a gate signal.

A first common electrode line 1275 is further formed on the substrate 110. The first common electrode line 1275 may be formed on the same layer as the first gate line 1121 and extends in a parallel direction with the first gate line 1121. The first common electrode line 1275 transfers a common voltage, and the common voltage may be configured by a first voltage and a second voltage. The first voltage and the second voltage are alternately applied to the first common electrode line 1275 on a period of one frame.

A storage electrode 135 is further formed on the substrate 110. The storage electrodes 135 are formed in the first subpixel sPX1 and the second subpixel sPX2. The storage electrodes 135 may be formed on the same layer as the first gate line 1121. The storage electrodes 135 may be formed in a horizontal direction and a vertical direction, shapes thereof may be variously modified, and in some cases, the storage electrodes 135 may be also omitted.

A gate insulating layer 140 is formed on the first gate line 1121, the first gate electrode 1124, the first common electrode line 1275, and the storage electrode 135. The gate insulating layer 140 may be made of an inorganic insulating material such as silicon nitride (SiNx) and silicon oxide (SiOx). Further, the gate insulating layer 140 may be formed as a single layer or a multilayer.

A first semiconductor 1154 is formed on the gate insulating layer 140, and the first semiconductor 1154 is disposed on the first gate electrode 1124. The first semiconductor 1154 may be made of amorphous silicon, polycrystalline silicon, oxide semiconductor, or the like.

Respective ohmic contacts (not illustrated) may be further formed on the first semiconductor 1154. The ohmic contacts may be made of silicide or a material such as n+ hydrogenated amorphous silicon in which an n-type impurity is doped at a high concentration.

On the first semiconductor 1154 and the gate insulating layer 140, a first data line 1171, a second data line 2171, a first source electrode 1173, and a first drain electrode 1175 are formed.

The first data line 1171 and the second data line 2171 extend substantially in a vertical direction and cross the first gate line 1121. The first data line 1171 and the second data line 2171 transfer data signals. The second data line 2171 transfers a data voltage having a different polarity from the first data line 1171.

The first source electrode 1173 is formed to protrude on the first gate electrode 1124 from the first data line 1171. The first drain electrode 1175 includes one wide end portion and the other rod-shaped end portion. The wide end portion of the first drain electrode 1175 overlaps with the storage electrode 135, and the rod-shaped end portion of the first drain electrode 1175 is partially surrounded by the first source electrode 1173.

The first gate electrode 1124, the first source electrode 1173, and the first drain electrode 1175 form the first thin film transistor Q1 together with the first semiconductor 1154, and a channel of the first thin film transistor Q1 is formed in the first semiconductor 1154 between the first source electrode 1173 and the first drain electrode 1175.

On the first data line 1171, the second data line 2171, the first source electrode 1173, and the first drain electrode 1175, a passivation layer 180 is formed. The passivation layer 180 may be made of an organic insulating material or an inorganic insulating material, and may be formed by a single layer or a multilayer.

Color filters 230 in a plurality of pixels PX are formed on the passivation layer 180.

Each color filter 230 may display one of the primary colors such as three primary colors of red, green and blue. The color filter 230 is not limited to the three primary colors of red, green and blue, but may also display one of cyan, magenta, yellow, and white-based colors.

Light blocking members 220 are formed in regions between the adjacent color filters 230. The light blocking members 220 are formed on a boundary of each pixel configuring the plurality of pixels and the thin film transistor formed for each pixel unit to prevent light leakage. The color filter 230 and the light blocking member 220 may overlap with each other in a partial region.

A first insulating layer 240 may be further formed on the color filter 230 and the light blocking member 220. The first insulating layer 240 may be made of an organic insulating material or an inorganic insulating material, and may be formed by a single layer or a multilayer. The first insulating layer 240 may also be formed by laminating an organic insulating material and an inorganic insulating material.

A contact hole 1181 exposing the wide end portion of the first drain electrode 1175 is formed in the passivation layer 180 and the first insulating layer 240.

Pixel electrodes 1191 and 2191 are formed on the first insulating layer 240 in the pixel. The pixel electrodes 1191 and 2191 may be made of transparent metal oxide such as indium tin oxide (ITO) and indium zinc oxide (IZO). The pixel electrode 1191 includes a first subpixel electrode 1191 and a second subpixel electrode 2191. The first subpixel electrode 1191 is disposed in the first subpixel sPX1, and the second subpixel electrode 2191 is disposed in the second subpixel sPX2. The first subpixel electrode 1191 and the second subpixel electrode 2191 are connected to each other. A ratio of the first subpixel electrode 1191 to the second subpixel electrode 2191 may be about 1:1 to about 1:2. Preferably, the ratio of the first subpixel electrode 1191 to the second subpixel electrode 2191 may be about 1:1.5 to about 1:2.

The first subpixel electrode 1191 and the second subpixel electrode 2191 are connected with the first drain electrode 1175 through the contact hole 1181. Accordingly, when the first thin film transistor Q1 is turned on, the first subpixel electrode 1191 and the second subpixel electrode 2191 receive the same data voltage from the first drain electrode 1175.

The overall shape of each of the first subpixel electrode 1191 and the second subpixel electrode 2191 is a quadrangle. The first subpixel electrode 1191 and the second subpixel electrode 2191 include a cross stem configured by horizontal stems 1192 and 2192 and vertical stem portions 1193 and 2193 crossing the horizontal stems 1192 and 2192, respectively. Further, the first subpixel electrode 1191 and the second subpixel electrode 2191 include a plurality of minute branches 1194 and 2194 extended from the vertical stems, respectively.

Each of the first subpixel electrode 1191 and the second subpixel electrode 2191 is divided into four domains by the horizontal stem portions 1192 and 2192 and the vertical stem portions 1193 and 2193. The minute branches 1194 and 2194 obliquely extend from the horizontal stems 1192 and 2192 and the vertical stems 1193 and 2193, and the extending direction may form an angle of approximately 45° or 135° with the first gate line 1121 or the horizontal stems 1192 and 2192. Further, extending directions of the minute branches 1194 and 2194 of the two adjacent domains may be orthogonal to each other.

Although not illustrated, the first subpixel electrode 1191 and the second subpixel electrode 2191 may further include outer stems surrounding outsides of the first subpixel sPX1 and the second subpixel sPX2.

The layout of the pixel area, the structure of the thin film transistor, and the shape of the pixel electrode described above are just exemplified, and the present inventive concept is not limited thereto and may be variously modified.

A first common electrode 1270 is formed on the first subpixel electrode 1191 so as to be spaced apart from the first subpixel electrode 1191 at a regular distance. The first subpixel electrode 1191 overlaps with the first common electrode 1270, and a microcavity 305 is formed between the first subpixel electrode 1191 and the first common electrode 1270. That is, the microcavity 305 is surrounded by the first subpixel electrode 1191 and the first common electrode 1270. The common electrode 1270 is formed to cover an upper surface and a side of the microcavity 305. A size of one pixel may be variously changed according to a size and a resolution of the display device, and as a result, a size of the microcavity 305 is changed.

The first common electrode 1270 may overlap with the second data line 2171. Further, the first common electrode 1270 overlaps with the storage electrode 135 and overlaps with the first common electrode line 1275. Contact holes 1183 and 1185 exposing portions of the storage electrode 135 and the first common electrode line 1275 are formed in the passivation layer 180 and the first insulating layer 240. The first common electrode 1270 is connected with the storage electrode 135 and the first common electrode line 1275 through the contact holes 1183 and 1185. The first common electrode 1270 receives a common voltage through the first common electrode line 1275.

A second common electrode 2270 is formed on the second subpixel electrode 2191 so as to be spaced apart from the second subpixel electrode 2191 at a regular distance. The second subpixel electrode 2191 overlaps with the second common electrode 2270, and a microcavity 305 is formed between the second subpixel electrode 2191 and the second common electrode 2270.

The first common electrode 1270 and the second common electrode 2270 may be made of transparent metal oxide such as indium tin oxide (ITO) and indium zinc oxide (IZO).

A first alignment layer or a lower alignment layer 11 is formed on the first pixel electrodes 1191 and 2191. A second alignment layer or an upper alignment layer 21 is formed below the first common electrode 1270 and the second common electrode 2270 so as to face the first alignment layer 11.

The first alignment layer 11 and the second alignment layer 21 may be formed by vertical alignment layers, and made of alignment materials such as polyamic acid, polysiloxane, and polyimide. The first and second alignment layers 11 and 21 may be connected to each other at a side wall of an edge of the microcavity 305.

A liquid crystal layer formed by liquid crystal molecules 310 is disposed in the microcavity 305. The liquid crystal molecules 310 have negative dielectric anisotropy, and may aligned in a vertical direction to the substrate 110 while the electric field is not applied. That is, the liquid crystal molecules 310 may be vertically aligned liquid crystal.

The first subpixel electrode 1191 to which the data voltage is applied generates an electric field together with the first common electrode 1270 to determine directions of the liquid crystal molecules 310 disposed in the microcavity 305. Further, the second subpixel electrode 2191 generates an electric field together with the second common electrode 2270 to determine directions of the liquid crystal molecules 310 disposed in the microcavity 305. Luminance of light passing through the liquid crystal layer varies according to the directions of the liquid crystal molecules 310 determined above.

A second insulating layer 350 may be further formed on the first common electrode 1270 and the second common electrode 2270. The second insulating layer 350 may be made of an inorganic insulating material such as silicon nitride (SiNx) and silicon oxide (SiOx), and may be omitted in some cases.

A roof layer 360 is formed on the second insulating layer 350. The roof layer 360 may be made of an organic material. The roof layer 360 is formed substantially in a horizontal direction to cover a plurality of microcavities 305 which is disposed in a row direction. The roof layer 360 is formed to cover an upper surface and a side of the microcavity 305. The roof layer 360 is hardened by a curing process to serve to maintain the shape of the microcavity 305.

The first common electrode 1270, the second common electrode 2270, and the roof layer 360 are formed to cover some edges of the microcavity 305 and expose the other edges thereof. In this case, a portion where the microcavity 305 is not covered by the first common electrode 1270, the second common electrode 2270, and the roof layer 360 is called an injection hole 307. The injection hole 307 exposes the first edge and the second edge of the microcavity 305, and the first edge and the second edge are edges facing each other. For example, on a plan view, the first edge may be an upper edge of the microcavity 305, and the second edge may be a lower edge of the microcavity 305. Since the microcavity 305 is exposed by the injection hole 307, an aligning agent, a liquid crystal material, or the like may be injected into the microcavity 305 through the injection hole 307.

A third insulating layer 370 may be further formed on the roof layer 360. The third insulating layer 370 may be made of an inorganic insulating material such as silicon nitride (SiNx) and silicon oxide (SiOx). The third insulating layer 370 may be formed to cover an upper surface and a side of the roof layer 360. The third insulating layer 370 serves to protect the roof layer 360 made of an organic material and may be omitted in some cases.

An overcoat 390 is formed on the third insulating layer 370. The overcoat 390 is formed to cover the injection hole 307 exposing a part of the microcavity 305 to the outside. That is, the overcoat 390 may seal the microcavity 305 so that the liquid crystal molecules 310 formed in the microcavity 305 are not discharged to the outside. Since the overcoat 390 contacts the liquid crystal molecules 310, the overcoat 390 may be made of a material which does not react with liquid crystal molecules 310. For example, the overcoat 390 may be made of parylene and the like.

The overcoat 390 may be formed by a multilayer such as a double layer and a triple layer. The double layer is configured by two layers made of different materials. The triple layer is configured by three layers, and materials of adjacent layers are different from each other. For example, the overcoat 390 may include a layer made of an organic insulating material and a layer made of an inorganic insulating material.

Although not illustrated, polarizers may be further formed on upper and lower surfaces of the liquid crystal display device. The polarizers may be configured by a first polarizer and a second polarizer.

The first polarizer may be attached onto the lower surface of the substrate 110, and the second polarizer may be attached onto the overcoat 390.

Figure 7:
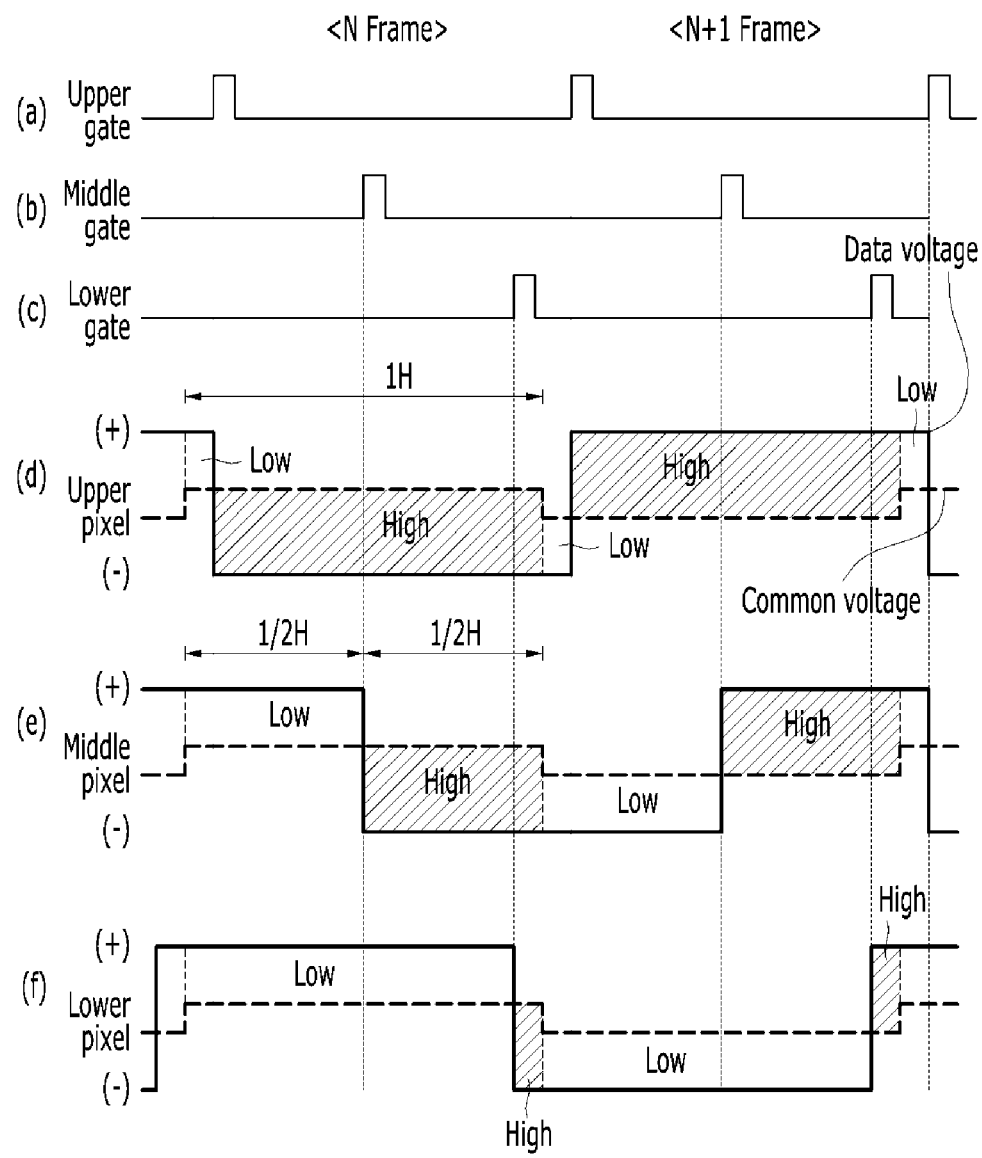
FIG. 7 is a timing diagram of a signal applied to the liquid crystal display device according to the exemplary embodiment of the present inventive concept.

FIG. 7 is a timing diagram of a signal applied to the liquid crystal display device according to the exemplary embodiment of the present inventive concept.

The liquid crystal display device according to the exemplary embodiment of the present inventive concept may include a plurality of first common electrodes ComA and a plurality of first gate lines 1121. The liquid crystal display device may be divided into three portions by setting a parallel direction with the first gate line G1 as a boundary line. For example, the liquid crystal display device may be divided into upper, middle, and lower regions.

In FIG. 7, a gate signal applied to any first gate line 1121 which is disposed in each of the three regions, a data voltage applied to the first subpixel electrode 1191 connected to each first gate line 1121, and a common voltage applied to the first common electrode 1270 overlapping with each first subpixel electrode 1191 are illustrated.

Gate-on voltages may be sequentially applied to a plurality of first gate lines 1121. A gate-on voltage is first applied to the first gate line 1121 disposed in an upper region of the liquid crystal display device, a gate-on voltage is applied to the first gate line 1121 disposed in the middle region, and next, a gate-on voltage is applied to the first gate line 1121 disposed in the lower region. In FIG. 7, only a signal applied to one first gate line 1121 among the plurality of first gate lines 1121 disposed at each portion is illustrated, and signals applied to the rest of the first gate lines 1121 are omitted. The gate-on voltages are sequentially applied to the rest of the first gate lines 1121.

When the gate-on voltage is applied to the first gate line 1121 disposed in the upper region, a data voltage is applied to the first subpixel electrode sPX1 connected to the corresponding first gate line 1121. In this case, the data voltage applied to the first subpixel electrode sPX1 may be applied as a positive or negative data voltage according to a gate-on voltage. As illustrated in FIG. 7(d), at a start point of an N-th frame, the negative data voltage is applied to the first subpixel electrode sPX1, and at a start point of an N+1-th frame, the positive data voltage may be applied to the first subpixel electrode sPX1.

Simultaneously, the common voltage applied to the first common electrode ComA which overlaps with the corresponding first subpixel electrode sPX1 is changed. In the N-th frame, the common voltage applied to the first common electrode 1270 is changed from a first voltage to a second voltage which is higher than the first voltage, and in the N+1-th frame, the common voltage applied to the first common electrode 1270 may be changed from the second voltage to the first voltage.

In this case, in the N-th frame, the first voltage is applied to the second common electrode 2270, and in the N+1-th frame, the voltage applied to the second common electrode 2270 may be changed from the first voltage to the second voltage. According to the exemplary embodiment of the present inventive concept, the voltages applied to the common electrode 2270 are changed every frame. However, the voltages applied to the common electrode may be changed every two frames or more. Hereinafter, in this specification, it is assumed that a time period between a gate-on signal of a previous row and a gate-on signal of a next row is one horizontal time period 1H, and a changing interval of voltage which is applied to the common electrode 2270 will be described as a multiple of 1H.

Due to a time when the gate-on voltage is applied to the pixel in the upper region and a time when the common voltage is applied to the pixel is substantially same, as illustrated in FIG. 7(d), in the N-th frame, a time period when the corresponding pixel is maintained with a positive polarity during 1H period is enough to rearrange the liquid crystal molecules.

Next, as illustrated in FIG. 7(e), when the gate-on voltage is applied to the first gate line 1121 disposed in the middle region, a data voltage is applied to the first subpixel electrode 1191 connected to the corresponding first gate line 1121. In the middle region, the gate-on voltage applied through the first gate line 1121 is delayed at a regular interval because the gate-on voltage is sequentially applied from the upper region. For example, at a middle point of an N-th frame, the negative data voltage is applied to the first subpixel electrode sPX1, and at a middle point of an N+1-th frame, the positive data voltage may be applied to the first subpixel electrode sPX1.

Accordingly, the data voltage applied in the N-th frame is changed from the positive data voltage to the negative data voltage based on an applying time of the gate-on voltage. Further, in the data voltage applied in the N+1-th frame, the negative data voltage which has been applied at the last half of the N-th frame is maintained until the next gate-on voltage is applied and then changed to the positive data voltage again from the time when the gate-on voltage is applied.

Simultaneously, the common voltage applied to the first common electrode 1270 which overlaps with the corresponding first subpixel electrode 1191 is changed. A timing when the common voltage is applied and changed is the same as time in the upper region.

When the pixel in the middle region is compared with the pixel in the upper region, in the middle region, the time when the gate-on voltage is applied is delayed by a predetermined period as compared with the upper region, while the time and the period when the common voltage is applied to the first common electrode 1270 are the same as those in the upper region. Accordingly, as illustrated in FIG. 7(e), in the N-th frame, the time when the corresponding pixel is maintained with the positive polarity and the time when the corresponding pixel is maintained with the negative polarity are substantially the same as each other at ½H.

Next, as illustrated in FIG. 7(f), when the gate-on voltage is applied to the first gate line 1121 positioned in the lower region, a data voltage is applied to the first subpixel electrode 1191 connected to the corresponding first gate line 1121. In the lower region, the gate-on voltage applied through the first gate line 1121 is delayed at a regular interval because the gate-on voltage is sequentially applied from the upper region. For example, at an end point of the N-th frame, the negative data voltage is applied to the first subpixel electrode sPX1, and at an end point of the N+1-th frame, the positive data voltage may be applied to the first subpixel electrode sPX1.

When the pixel in the lower region is compared with the pixel in the middle region, in the lower region, the time when the gate-on voltage is applied is delayed by a predetermined period as compared with the middle region, while the time and the period when the common voltage is applied to the first common electrode 1270 are the same as those in the middle region. Accordingly, as illustrated in FIG. 7(f), in the N-th frame, the corresponding pixel is maintained with the negative polarity during 1H when the second common voltage is applied.

As a result, in the upper region, each subpixels maintain their pixel voltage enough time to rearrange the liquid crystal molecules, while in the middle region and the lower region, due to a difference between the timing of changing the common voltage and the timing of applying the gate-on voltage, each subpixels may not maintain their pixel voltage enough time to rearrange the liquid crystal molecules. The pixel voltage maintaining time affects the rearrangement of liquid crystals in the pixel and the rearrangement of liquid crystals in the pixel is increased as the pixel voltage maintaining time of the pixel is increased, while the rearrangement of liquid crystals in the pixel is decreased when the pixel voltage maintaining time is decreased. Accordingly, in the middle region and the lower region of the liquid crystal display device, a visibility deterioration problem occurs.

Figure 8:
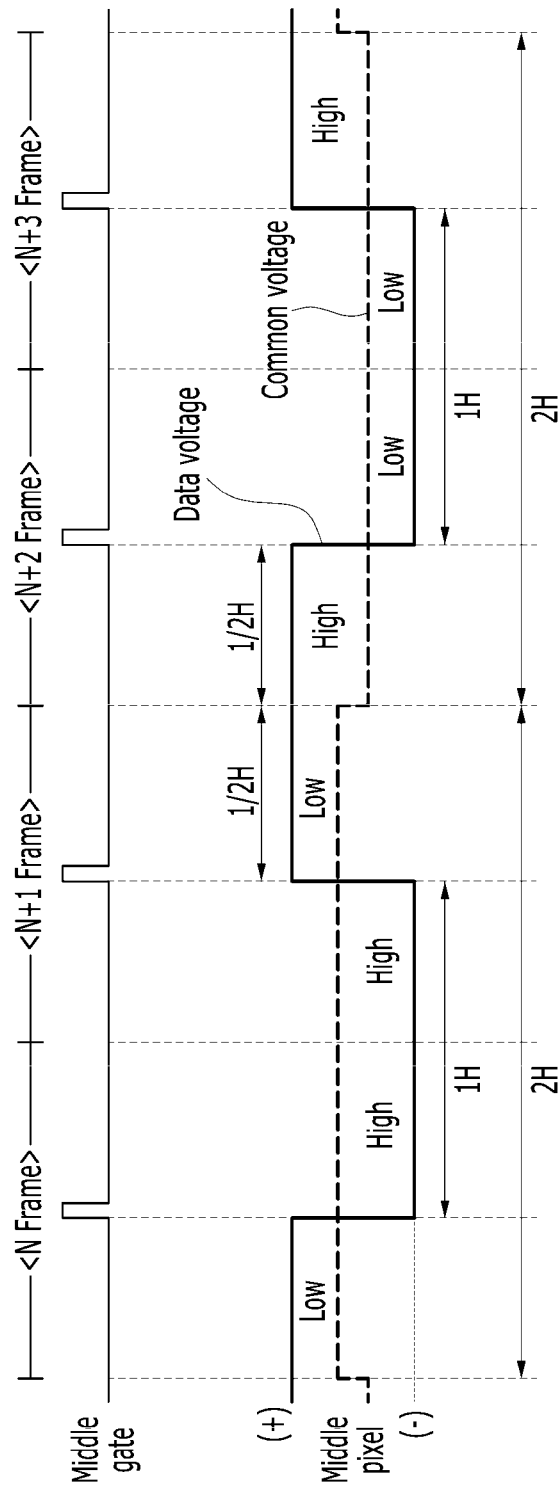
FIG. 8 is a diagram illustrating an example of a timing of a signal applied to the liquid crystal display device according to the exemplary embodiment of the present inventive concept.

FIG. 8 is a diagram illustrating an example of a timing of a signal applied to the liquid crystal display device according to the exemplary embodiment of the present inventive concept, and in detail, illustrates a signal timing diagram in the middle region of the liquid crystal display device.

Referring to FIG. 8, the gate signal is applied through any first gate line 1121 positioned in the middle region, and the data voltage is applied to the first subpixel electrode 1191 connected to the first gate line 1121. In this case, the data voltage is changed and applied to the positive data voltage or the negative data voltage at the middle point of each frame.

In addition, in the liquid crystal display device according to the exemplary embodiment of the present inventive concept, the period when the common voltage is applied to the first common electrode 1270 overlapping with the first subpixel electrode 1191 may be increased by two times to be set as 2H. In the N-th frame, the common voltage applied to the first common electrode 1270 is changed from a first voltage to a second voltage which is higher than the first voltage, and in the N+2-th frame, the common voltage applied to the first common electrode 1270 may be changed from the second voltage to the first voltage because the common voltage is changed every two frames.

Accordingly, in the N-th frame, like the N-th frame of FIG. 7(e), times when the pixel is maintained with a negative polarity and a positive polarity are the same as each other at ½H, in the N+1-th frame, times when the pixel is maintained with a negative polarity and a positive polarity are the same as each other at ½H. However, the pixel which has the positive polarity from the period after ½H of the N-th frame may be maintained with the positive polarity until the ½H period of the N+1-th frame. Accordingly, even in the pixel of the middle region, the polarity maintaining period is ensured by 1H through two adjacent frames, N Frame and N+1 frame, and the delay due to the late liquid crystal response speed is compensated, thereby improving visibility.

Referring to FIG. 8, the negative polarity represented after the ½H period of the N+2-th frame is delayed up to the first half ½H period of an N+3-th frame to compensate for the liquid crystal response speed through the N+2-th frame and the N+3-th frame.

As such, according to the exemplary embodiment of the present inventive concept, when the change period of the common voltage applied to the first common electrode 1270 is increased two times, the period when the pixel is maintained with the positive polarity or the negative polarity in the middle region may be increased by 1H. Further, since the positive/negative maintaining period of the pixel having the period of ½H may be reduced in half, the afterimage may be reduced and the liquid crystal response speed may be improved.

In addition, although not illustrated in FIG. 8, in the upper region and the lower region of the liquid crystal display device, the common voltage is changed every two frames, thereby improving visibility.

Figure 9:
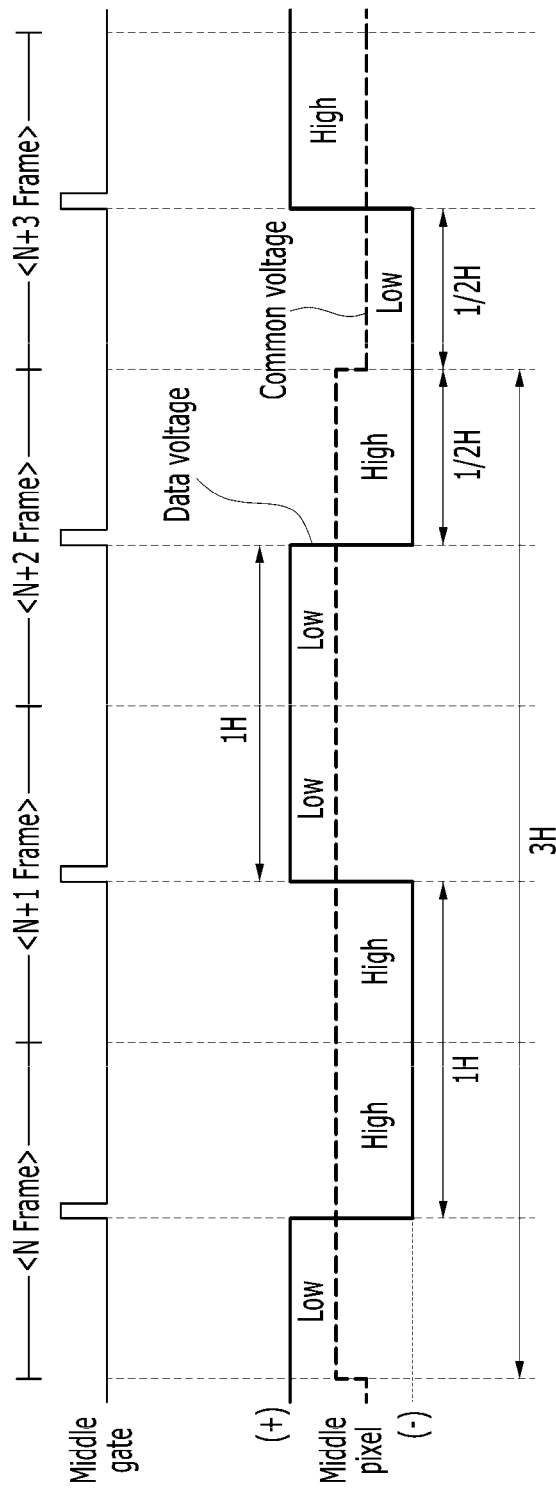
FIG. 9 is a diagram illustrating another example of a timing of a signal applied to the liquid crystal display device according to the exemplary embodiment of the present inventive concept.

FIG. 9 is a diagram illustrating another example of a timing of a signal applied to the liquid crystal display device according to the exemplary embodiment of the present inventive concept, and in detail, illustrates a signal timing diagram in the middle region of the liquid crystal display device.

Referring to FIG. 9, similarly, the gate signal is applied through any first gate line 1121 positioned in the middle region, and the data voltage is applied to the first subpixel electrode 1191 connected to the first gate line 1121. In this case, the data voltage is changed and applied to the positive data voltage or the negative data voltage at the end point of each frame.

In addition, in the liquid crystal display device according to the exemplary embodiment of the present inventive concept, the period when the common voltage is applied to the first common electrode 1270 overlapping with the first subpixel electrode 1191 may be increased three times to be set as 3H. In the N-th frame, the common voltage applied to the first common electrode 1270 is changed from a first voltage to a second voltage which is higher than the first voltage, and in the N+3-th frame, the common voltage applied to the first common electrode 1270 may be changed from the second voltage to the first voltage because the common voltage is changed every three frames.

Accordingly, in the N-th frame, at the frame middle point, the pixel is changed from the negative polarity to the positive polarity, in the N+1-th frame, at the frame middle point, the pixel is changed from the positive polarity to the negative polarity, and in the N+2-th frame, at the frame middle point, the pixel is changed from the negative polarity to the positive polarity. That is, when the common voltage change period is increased three times, for example 3H, the data voltages are maintained at a target voltage during 2H, and the data voltages are not maintained at a target voltage during 1H but changed from a target voltage to a voltage lower than the target voltage.

In addition, although not illustrated in FIG. 9, in the upper region and the lower region of the liquid crystal display device, the common voltage is changed every three frames, thereby improving visibility.

According to the exemplary embodiment of the present inventive concept described above with reference to FIGS. 8 and 9, when the period of changing the common voltage applied to the first common electrode and the second common electrode is increased 2H times or more, the after image in the middle region and the lower region may be reduced due to an improvement in the rearrangement of the liquid crystal.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A liquid crystal display device, comprising:
 a substrate;
 a first gate line disposed on the substrate;
 a first data line and a second data line disposed on the substrate and to which data voltages with different polarities are applied;
 a first thin film transistor electrically connected to the first gate line and the first data line;
 a first pixel electrode electrically connected to the first thin film transistor;
 a liquid crystal layer disposed on the first pixel electrode; and
 a first common electrode and a second common electrode disposed on the liquid crystal layer,
 wherein the first pixel electrode includes a first subpixel electrode overlapping with the first common electrode and a second subpixel electrode overlapping with the second common electrode,
 wherein, when a first voltage is applied to the first common electrode, a second voltage different from the first voltage is applied to the second common electrode, and when the second voltage is applied to the first common electrode, the first voltage is applied to the second common electrode,
 wherein the first voltage and the second voltage are alternatingly applied to the first common electrode and the second common electrode every two or more frames, and
 wherein the second voltage is higher than the first voltage.

2. The liquid crystal display device of claim 1, further comprising:
 a second thin film transistor electrically connected to the first gate line and the second data line, and
 a second pixel electrode electrically connected to the second thin film transistor,
 wherein the second pixel electrode includes a third subpixel electrode overlapping with the first common electrode and a fourth subpixel electrode overlapping with the second common electrode.

3. The liquid crystal display device of claim 2, wherein a positive data voltage is applied to the first pixel electrode and a negative data voltage is applied to the second pixel electrode.

4. The liquid crystal display device of claim 3, wherein the liquid crystal display device includes a plurality of the first gate lines,
 wherein gate-on voltages are sequentially applied to the plurality of first gate lines, and
 wherein a timing when the positive data voltage is applied to the first pixel electrode and the negative data voltage is applied to the second pixel electrode is determined according to a signal applied to the first gate line.

5. The liquid crystal display device of claim 4, wherein the first voltage and the second voltage are alternatingly applied to the first common electrode and the second common electrode every two frames.

6. The liquid crystal display device of claim 5, wherein, in the first pixel electrode disposed in a middle region of the liquid crystal display device, when a common voltage applied to the first common electrode is changed from the first voltage to the second voltage in an N-th frame and changed from the second voltage to the first voltage in an N+2-th frame, the common voltage applied to the second common electrode is changed from the second voltage to the first voltage in the N-th frame and changed from the first voltage to the second voltage in the N+2-th frame.

7. The liquid crystal display device of claim 4, wherein:
 the first voltage and the second voltage are alternatingly applied to the first common electrode and the second common electrode every three frames.

8. The liquid crystal display device of claim 7, wherein, in the first pixel electrode disposed in a middle region of the liquid crystal display device, when a common voltage applied to the first common electrode is changed from the first voltage to the second voltage in an N-th frame and changed from the second voltage to the first voltage in an N+3-th frame, the common voltage applied to the second common electrode is changed from the second voltage to the first voltage in the N-th frame and changed from the first voltage to the second voltage in the N+3-th frame.

9. The liquid crystal display device of claim 1, further comprising:
a second gate line disposed on the substrate;
a third data line disposed on the substrate and to which the data voltage having the same polarity as the first data line is applied;
a third thin film transistor electrically connected to the second gate line and the second data line;
a fourth thin film transistor electrically connected to the second gate line and the third data line;
a third pixel electrode electrically connected to the third thin film transistor; and
a fourth pixel electrode electrically connected to the fourth thin film transistor,
wherein the third pixel electrode includes a fifth subpixel electrode overlapping with the second common electrode and a sixth subpixel electrode overlapping with the first common electrode, and the fourth pixel electrode includes a seventh subpixel electrode overlapping with the second common electrode and an eighth subpixel electrode overlapping with the first common electrode.

10. The liquid crystal display device of claim 9, wherein the fifth subpixel electrode and the sixth subpixel electrode are connected to each other, and the seventh subpixel electrode and the eighth subpixel electrode are connected to each other.

11. The liquid crystal display device of claim 1, further comprising:
a first common electrode line and a second common electrode line disposed on the substrate,
wherein the first common electrode line is connected with the first common electrode, and the second common electrode line is connected with the second common electrode.

12. The liquid crystal display device of claim 11, wherein the first common electrode line and the second common electrode line are disposed on the same layer as the first gate line.

13. The liquid crystal display device of claim 1, further comprising:
a roof layer disposed on the first common electrode and the second common electrode; and
an overcoat disposed on the roof layer.

14. The liquid crystal display device of claim 13, further comprising:
a plurality of microcavities of which an upper surface and a side are covered by the roof layer and the overcoat,
wherein the liquid crystal layer is disposed in the plurality of microcavities.

* * * * *